(12) United States Patent
Elbs

(10) Patent No.: US 9,096,011 B2
(45) Date of Patent: Aug. 4, 2015

(54) BLOW MOLDING VALVE FOR A BLOW MOLDING VALVE BLOCK

(75) Inventor: Christian Elbs, Ennetbuhl (CH)

(73) Assignee: Norgren GmbH, Alpen (DE)

( * ) Notice: Subject to any disclaimer, the term of this patent is extended or adjusted under 35 U.S.C. 154(b) by 454 days.

(21) Appl. No.: 13/499,818

(22) PCT Filed: Oct. 7, 2010

(86) PCT No.: PCT/EP2010/006131
§ 371 (c)(1),
(2), (4) Date: Apr. 2, 2012

(87) PCT Pub. No.: WO2011/042184
PCT Pub. Date: Apr. 14, 2011

(65) Prior Publication Data
US 2012/0201918 A1    Aug. 9, 2012

Related U.S. Application Data

(60) Provisional application No. 61/250,129, filed on Oct. 9, 2009.

(51) Int. Cl.
*B29C 49/78* (2006.01)
*B29C 49/06* (2006.01)
(Continued)

(52) U.S. Cl.
CPC ............. *B29C 49/783* (2013.01); *B29C 49/06* (2013.01); *B29C 49/12* (2013.01); *B29C 49/4289* (2013.01);
(Continued)

(58) Field of Classification Search
CPC ... B29C 49/783; B29C 49/4289; F16K 41/10; F16K 41/103; F16K 41/12; F16K 7/12; F16K 7/14; F16K 7/16; F16K 7/17; F16K 7/18

USPC ............... 425/129, 535; 251/45, 129.17, 331, 251/335.2; 264/523
See application file for complete search history.

(56) References Cited

U.S. PATENT DOCUMENTS 4,867,201 A * 9/1989 Carten ..................... 137/625.18
5,186,434 A * 2/1993 Nishimura et al. ........... 251/331
(Continued)

FOREIGN PATENT DOCUMENTS

| JP | 2004076787 A | 11/2004 |
| JP | 2009058057 A | 3/2009 |
| WO | 2008046433 A1 | 4/2008 |

OTHER PUBLICATIONS

Database WPI Week 200425, Thomson Scientific, London, GB; AN 2004-262151—English abstract of JP 2004 076787 A.
Database WPI Week 200926, Thomson Scientific, London, GB; AN 2009-G09065—English abstract of JP 2009 058057 A.

*Primary Examiner* — Timothy Kennedy
(74) *Attorney, Agent, or Firm* — The Ollila Law Group LLC

(57) ABSTRACT

A blow molding valve (400) is provided. The blow molding valve (400) is adapted to be positioned within a blow molding valve block (401) including a control pressure chamber (408), a process gas chamber (450), and a piston bore (413). The blow molding valve (400) includes a control piston (402) movable within the control pressure chamber (408) and a portion of the piston bore (413), the control piston (402) being in fluid communication with a control pressure supply. A diaphragm (405) is provided and positioned between the process gas chamber (450) and the control piston (402) such that the diaphragm provides a fluid tight barrier between the process gas chamber (450) and the control piston (402).

16 Claims, 7 Drawing Sheets

(51) Int. Cl.
*B29C 49/12* (2006.01)
*B29C 49/46* (2006.01)
*B29K 67/00* (2006.01)
*B29C 49/42* (2006.01)

(52) U.S. Cl.
CPC ..... *B29C 2049/4694* (2013.01); *B29K 2067/00* (2013.01); *Y10T 29/49412* (2015.01); *Y10T 29/49426* (2015.01); *Y10T 29/49826* (2015.01)

(56) References Cited

U.S. PATENT DOCUMENTS

| | | |
|---|---|---|
| 5,941,505 A | 8/1999 | Nagel |
| 6,685,164 B1 | 2/2004 | Koizumi et al. |
| 2006/0081807 A1 | 4/2006 | Browne et al. |
| 2007/0131890 A1* | 6/2007 | Nicolini .............. 251/335.2 |

* cited by examiner

BLOW MOLDING VALVE FOR A BLOW MOLDING VALVE BLOCK

TECHNICAL FIELD

The present invention relates to, the field of blow molding, and more particularly, to a blow molding valve that utilizes a diaphragm.

BACKGROUND OF THE INVENTION

Blow molding is a generally known process for molding a preform part into a desired product. The preform is in the general shape of a tube with an opening at one end for the introduction of pressurized gas, typically air. One specific type of blow molding is stretch blow molding (SBM). In SBM applications, a valve block provides both low and high pressure gas to expand the preform into a mold cavity. The mold cavity comprises the outer shape of the desired product. SBM can be used in a wide variety of applications; however, one of the most widely used applications is in the production of Polyethylene terephthalate (PET) products, such as drinking bottles. Typically, the SBM process uses a low pressure supply along with a stretch rod to stretch the preform in a longitudinal direction and radially outward and then uses a high pressure supply to expand the preform into the mold cavity. The resulting product is generally hollow with an exterior shape conforming to the shape of the mold cavity. The gas in the preform is then exhausted through one or more exhaust valves. This process is repeated during each blow molding cycle.

Because of the high pressures flowing into the preform, the valves that control the air flow typically include annular high-pressure seals. One such blow molding valve design is disclosed in international patent publication WO 2008/0426433. While this valve design can generally provide adequate sealing characteristics, the valves are faced with a number of other problems. One problem encountered is during a cleaning process. Due to the various chemicals and impurities that flow through the valves, the valves need to be cleaned periodically. Not only does the exposed valve face need to be cleaned, but the sealed gap that the valve slides along must be cleaned as well. This is because as the valve moves from a closed position to an open position, contaminates are dragged along with the valve seals thereby contaminating the valve piston's bore. As a result, existing blow valves cannot be adequately cleaned on-line. Therefore, existing blow molding valve blocks are required to be shut down and disassembled for cleaning. As can be appreciated, this process is time consuming and costly.

The present invention overcomes this and other problems and an advance in the art is achieved. The present invention replaces the standard seat valves typically used in blow molding valve blocks with a diaphragm valve that substantially isolates the process side of the valve from the control side of the valve. As a result, the valve block can be cleaned on-line without requiring the system to be disassembled. The valves can be cleaned much faster, in some cases the valves can be cleaned in as little as ten minutes.

SUMMARY OF THE INVENTION

A blow molding valve is provided according to an embodiment of the invention. The blow molding valve is positioned within a blow molding valve block including a control pressure chamber, a process gas chamber, and a piston bore. According to an embodiment of the invention, the blow molding valve comprises a control piston movable within the control pressure chamber and a portion of the piston bore, the control piston being in fluid communication with a control pressure supply. The blow molding valve also includes a diaphragm positioned between the process gas chamber and the control piston such that the diaphragm provides a fluid tight barrier between the process gas chamber and the control piston.

A method for forming a blow molding valve is provided according to an embodiment of the invention. The blow molding valve is positioned within a blow molding valve block including a control pressure chamber, a process gas chamber, and a piston bore. The method comprises the step of positioning a control piston within the control chamber such that the control piston is movable within the control pressure chamber and movable within a portion of the piston bore. According to an embodiment of the invention, the method also comprises positioning a diaphragm between the process gas chamber and the control piston such that the diaphragm provides a fluid tight barrier between the process gas chamber and the control piston.

ASPECTS

According to an aspect of the invention, a blow molding valve positioned within a blow molding valve block including a control pressure chamber, a process gas chamber, and a piston bore, the blow molding valve comprises:
  a control piston movable within the control pressure chamber and a portion of the piston bore, the control piston being in fluid communication with a control pressure supply; and
  a diaphragm positioned between the process gas chamber and the control piston such that the diaphragm provides a fluid tight barrier between the process gas chamber and the control piston.

Preferably, the blow molding valve further comprises an auxiliary piston movable within the piston bore and the process gas chamber, wherein the diaphragm is positioned between the auxiliary piston and the control piston.

Preferably, the blow molding valve further comprises a clamping member adapted to receive a portion of the diaphragm and provide a substantially fluid tight seal with the diaphragm.

Preferably, the clamping member forms at least a portion of the auxiliary piston bore.

Preferably, the blow molding valve further comprises a plurality of spaced apart tabs extending radially out from the auxiliary piston and engaging the auxiliary piston bore.

Preferably, the plurality of spaced apart tabs form a plurality of gaps that provide fluid communication between the process gas chamber and the second side of the diaphragm.

Preferably, the blow molding valve further comprises:
  a first fluid port formed in the process gas chamber; and
  a second fluid port formed in the process gas chamber;
  wherein the auxiliary piston is adapted to form a substantially fluid tight seal with a piston seat proximate the first fluid port.

Preferably, the blow molding valve further comprises a control port formed in the control chamber and adapted to communicate a control pressure supply with a first side of the control piston.

Preferably, the blow molding valve further comprises a vent port formed in the control pressure chamber and in fluid communication with a second side of the control piston.

Preferably, the blow molding valve further comprises:
a first fluid port formed in the process gas chamber; and
a second fluid port formed in the process gas chamber;
wherein the diaphragm is adapted to form a substantially fluid tight seal with a piston seat proximate the first fluid port.

Preferably, the diaphragm is positioned within the piston bore such that a portion of the piston bore is in fluid communication with the process gas chamber and wherein the diaphragm forms a substantially fluid tight barrier between the portion of the piston bore in fluid communication with the process gas chamber and the control piston.

According to another aspect of the invention, a method for forming a blow molding valve positioned within a blow molding valve block including a control pressure chamber, a process gas chamber, and a piston bore comprises the steps of:
positioning a control piston within the control chamber such that the control piston is movable within the control pressure chamber and movable within a portion of the piston bore; and
positioning a diaphragm between the process gas chamber and the control piston such that the diaphragm provides a fluid tight barrier between the process gas chamber and the control piston.

Preferably, the method further comprises the step of positioning an auxiliary piston movably within the piston bore, wherein the diaphragm is positioned between the auxiliary piston and the control piston.

Preferably, the method further comprises the step of positioning a portion of the diaphragm in a clamping member to form a fluid tight seal.

Preferably, the method of further comprises the step of forming the auxiliary piston bore in a portion of the clamping member.

Preferably, a plurality of spaced apart tabs extend radially from the auxiliary piston and engage the auxiliary piston bore.

Preferably, the plurality of spaced apart tabs form a plurality of gaps that provide fluid communication between the process gas chamber and the second side of the diaphragm.

Preferably, the method further comprises steps of:
forming a first fluid port in the process gas chamber;
forming a second fluid port in the process gas chamber; and
positioning a piston seat proximate the first fluid port adapted to form a fluid tight seal with the auxiliary piston.

Preferably, the method further comprises the step of forming a control port in the control chamber that is adapted to communicate a control pressure supply with a first side of the control piston.

Preferably, the method of further comprises the step of forming a vent port in the control chamber that is adapted to communicate with a second side of the control piston.

Preferably, the method further comprises the steps of:
forming a first fluid port in the process gas chamber;
forming a second fluid port in the process gas chamber; and
positioning a piston seat proximate the first fluid port adapted to form a fluid tight seal with the diaphragm.

Preferably, the diaphragm is positioned within the piston bore such that a portion of the piston bore is in fluid communication with the process gas chamber and wherein the diaphragm forms a substantially fluid tight barrier between the portion of the piston bore in fluid communication with the process gas chamber and the control piston.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
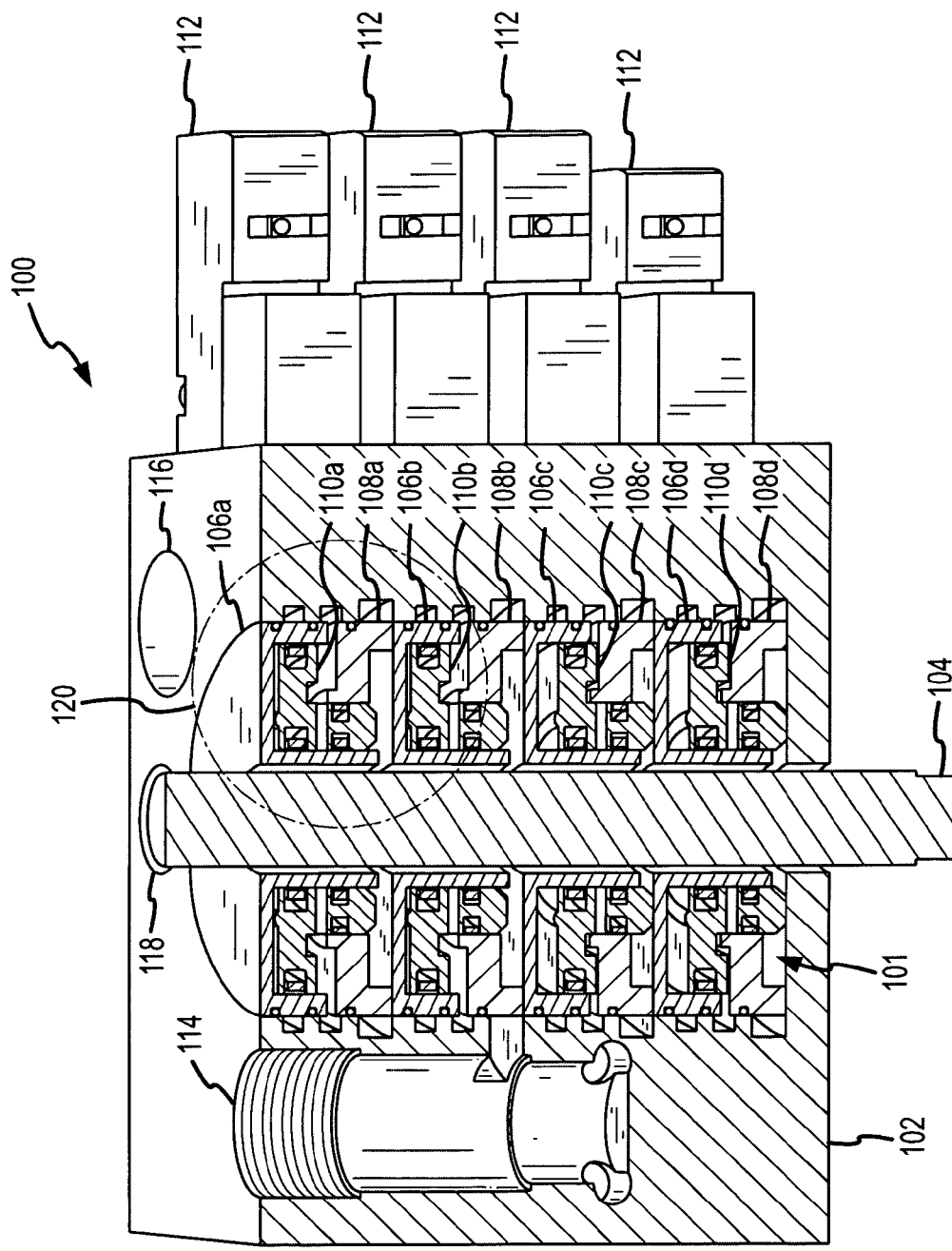
FIG. 1 shows a cross sectional view of a prior art blow molding valve block assembly.

FIG. 1 shows a prior art blow molding valve block assembly 100. The prior art blow molding valve block assembly 100 includes a valve block 102, a stretch rod 104, control chambers 106a-106d, operating chamber rings 108a-108d, valve pistons 110a-110d and pilot valves 112. The stretch rod 104 extends vertically through the center of the central chamber 101 and out through the bottom of the valve block 102. The valve block 102 includes four sets of valves that are vertically stacked in the central chamber 101 and around the stretch rod 104. As can be appreciated, a pilot air supply is provided by the pilot valves 112 in order to control the position of each valve piston 110a-110d. As can be seen, the valve pistons 110a and 110b are shown in the open position with the valve pistons 110c and 110d in the closed position. The valve block 102 also includes a number of inlet and outlet ports 114, 115, and 118. In use, the valve pistons are controlled using the various pilot valves 112 in order to direct the flow of pressurized gas through the valve block 102.

Figure 2:
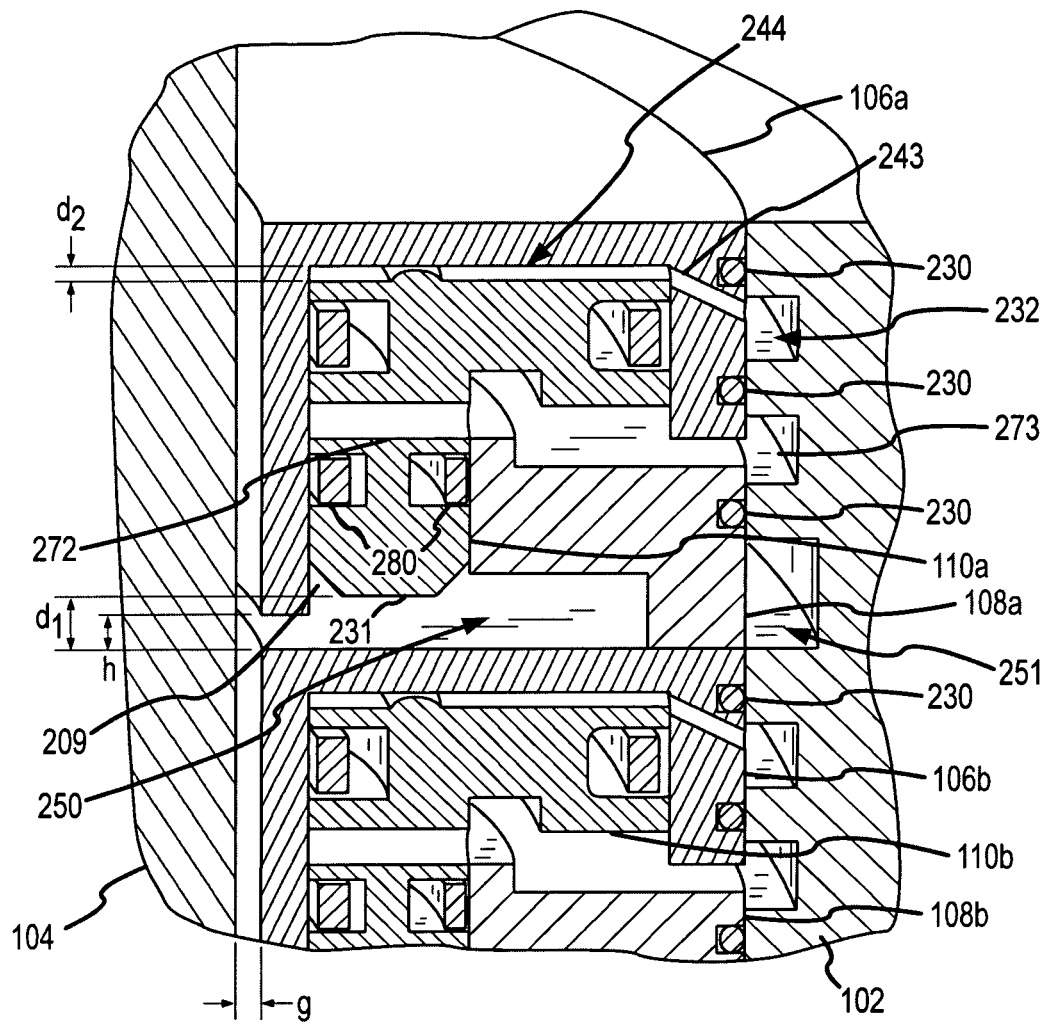
FIG. 2 shows a cross sectional view of detail 120 from FIG. 1.

FIG. 2 shows an enlarged view of 120 from FIG. 1. FIG. 2 shows one side of the top valve and a portion of the second valve. The valve includes a plurality of O-rings or gaskets 230 that form seals between the valve block 102 and the valve. The valve piston 110a is shown in the open position, which results in a space having a diameter $d_1$ between the valve seat 231 and the top of the control chamber ring 106b. The valve piston 110a may have a small clearance ($d_2$) between the top of the valve piston 110a and the bottom of the control chamber ring 106a. Furthermore, there is a gap, h, between the bottom of the control chamber ring 106a and the top surface of the control chamber ring 106b. Therefore, when the valve piston 110a is opened as shown, pressurized gas is permitted to flow from the opening 251 formed in the valve block 102, through the gaps $d_1$ and h. The pressurized fluid then flows down the passageway between the valve and the stretch rod 104, which has a gap, g.

As can be seen, gas is provided by the pilot valve 112 through openings 232 and 243 into control chamber 244. Fluid in the control chamber 244 pushes the valve piston 110a down until the valve seat 231 contacts the upper surface of the control chamber ring 106b. However, when the control chamber 244 is exhausted, pressurized gas can enter air chamber 250 through the opening 251 and travel through an opening (not shown) in the operating chamber ring 108a. A breathe hole 272 is provided in the valve piston 110a that can communicate with a breathe port 273 formed in the valve block 102. The breathe hole 272 and breathe port 273 allow the valve piston 110a to move more freely without creating a vacuum.

In order to seal the air chamber 250 off from the control chamber 244, the valve piston 110a is provided with high pressure annular seals 280. As can be appreciated, the high pressure annular seals 280 form a seal between the valve piston 110a and the valve piston bore 109 created by the operating chamber ring 108a and the control chamber ring 106a. While the high pressure annular seals 280 prevent the higher pressure gas in the air chamber 250 from interfering with the pilot air supply and vice versa, the high pressure annular seals 280 may carry contaminates from the air chamber 250 into the valve piston bore 209. The contaminates may come from the gas supplied to the preform or from the gas exhausted at the end of a molding cycle. Therefore, in order to properly clean the valve piston 110a, the valve piston 110a must be removed from the piston bore 209, thereby requiring the valve block 102 to be disassembled. This is not an ideal approach.

Figure 3:
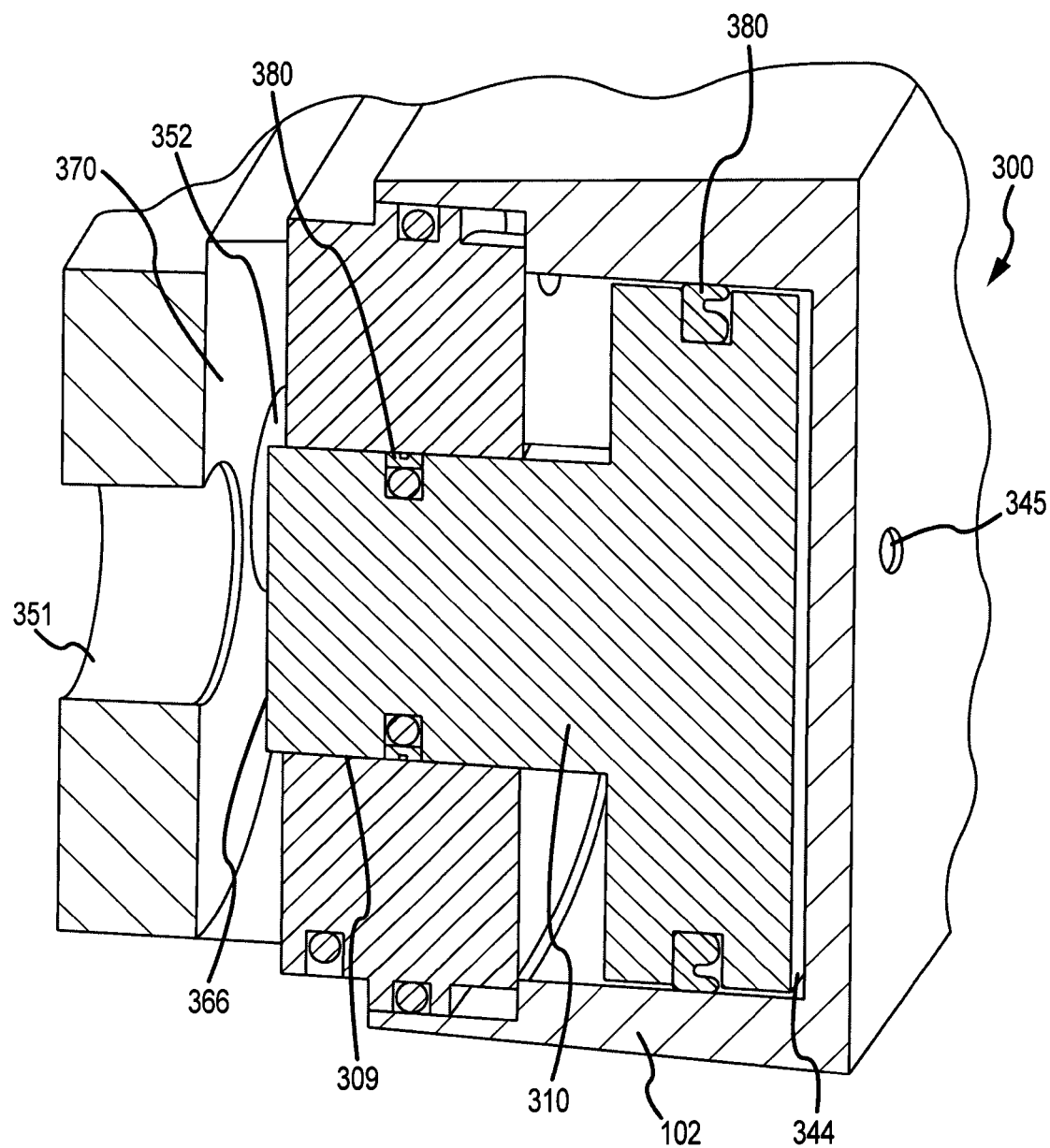
FIG. 3 shows a cross sectional view of a blow molding valve according to the prior art.

FIG. 3 shows a portion of another prior art blow molding valve 300 for a blow molding valve block, such as the blow molding valve block 102 shown in FIG. 1. The blow molding valve 300 includes a valve piston 310 with a valve seat portion 366, which is provided to seal against the sealing surface 370 of the supply block 102 to selectively allow fluid from the supply input 351 to flow into the supply outlet 352. The supply outlet 352 pressurizes the preform to mold the preform to the shape of the mold cavity. The position of the valve piston 310 is controlled by supplying a pilot pressure to the control chamber 344 through a pilot port 345. As can be appreciated, when the control chamber 344 is pressurized by a pilot valve, such as the pilot valve 112 through the pilot port 345, the valve piston 310 moves to the left as shown in the figure. The valve piston 310 will move to the left until the valve seat portion 366 seals against a sealing surface 370 of the valve block 102. Conversely, when the control chamber 344 is exhausted, the pressure in the input 351 biases the valve piston 310 away from the sealing surface 370. As a result, fluid flows from the input 351 to the supply outlet 352. The prior art valve piston 310 includes high-pressure annular seals 380. As can be appreciated, the annular seals 380 prevent the high input pressure from input 351 from reaching the control chamber 344. However, because the valve piston 310 moves back and forth within the piston bore 309 and there is nothing to isolate the piston bore 309 from the control chamber 344, contaminates from the input 351 can be dragged along the piston bore 309 and could eventually reach the control chamber 344. Therefore, while the seals 380 may seal the majority of the fluid from the input 351 from the control chamber 344, the control chamber is not isolated from the fluid input or from the piston bore 309. Therefore, like the prior art valve block shown in FIGS. 1 & 2, the prior art valve 300 shown in FIG. 3 cannot be cleaned efficiently while on-line. Rather, the valve 300 is required to be disassembled to properly and efficiently clean the system.

Figure 4:
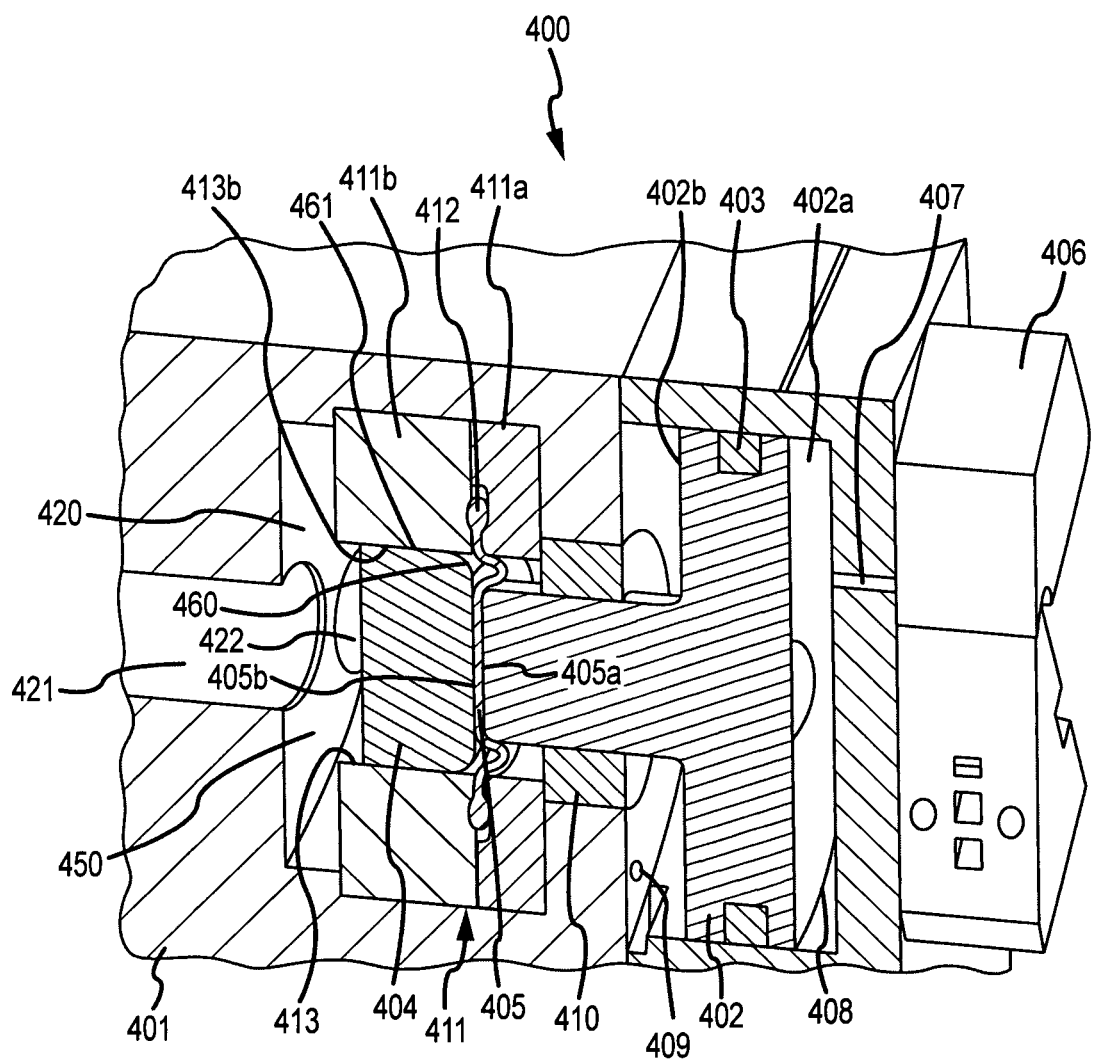
FIG. 4 shows a cross sectional view of a blow molding valve according to an embodiment of the invention.

FIG. 4 shows a cross sectional view of a blow molding valve 400 according to an embodiment of the invention. The blow molding valve 400 is adapted to be used in a blow molding apparatus. The blow molding apparatus may comprise a stretch-blow molding apparatus, or some other type of blow molding apparatus. The blow-molding valve 400 may be positioned in a blow molding valve block assembly, such as the blow molding valve block assembly 100 shown in FIG. 1. According to an embodiment of the invention, the blow-molding valve 400 is positioned within a valve block 401, which may include multiple valves similar to the blow-molding valve 400. Only a portion of the valve block 401 is shown in order to simplify the drawing. Therefore, it should be appreciated that in actuality, the valve block 401 may include numerous additional components and may be implemented in a larger assembly. The blow molding valve 400 can be adapted to selectively provide a flow path between a pressurized gas supply and a preform (not shown) in order to stretch the preform into the shape of the associated mold cavity (not shown). Additionally or alternatively, the blow molding valve 400 may be adapted to selectively exhaust pressure previously provided to the preform. The pressurized gas may comprise air or some other gas. While, air is assumed in the discussion below, it should be appreciated that the present invention is not limited to air and those skilled in the art will readily recognize alternative gases that may be used.

According to an embodiment of the invention, the blow-molding valve 400 comprises a control piston 402, an auxiliary piston 404, and a diaphragm 405 that separates the control piston 402 from the auxiliary piston 404.

According to an embodiment of the invention, the control piston 402 comprises a first side 402a and a second side 402b. According to an embodiment of the invention, the control piston 402 is movable within a control pressure chamber 408 formed in the valve block 401. According to an embodiment of the invention, a control pressure, such as a pilot pressure is provided to the control pressure chamber 408 from a pilot valve 406 via a control port 407. The control port 407 can be configured to supply the control pressure to the control chamber 408 as well as exhaust pressure from the control chamber 408. According to an embodiment of the invention, the control pressure acts on the first side 402a of the control piston 402 and pressurizes the control chamber 408. The control piston 402 may include one or more sealing members 403. The one or more sealing members 403 may form a substantially fluid tight seal between the control piston 402 and the control chamber 408. Therefore, pressure supplied by the pilot valve 406 can be applied to the first side 402a of the control piston 402 without escaping to the second side 402b of the control piston 402.

The control piston 402 can be adapted to move within the control chamber 408. The second side 402b of the control piston 402 is exposed to a vent 409 formed in the control chamber 408. The vent 409 allows the control piston 402 to move freely without creating a vacuum in the portion of the control chamber 408 exposed to the second side 402b of the control piston 402. As can be appreciated, the vent 409 can communicate with the atmosphere, for example.

According to an embodiment of the invention, a portion of the control piston 402 can extend through a guide seal 410. The guide seal 410 can ensure the control piston 402 is properly aligned with respect to the diaphragm 405, for example. According to an embodiment of the invention, a portion of the control piston 402 may contact the diaphragm 405. In some embodiments, the control piston 402 may be coupled to the first side 405a of the diaphragm. However, in other embodiments, the control piston 402 may only contact the diaphragm 405 when the control pressure chamber 408 is pressurized and the control piston 402 is biased towards the first position.

According to an embodiment of the invention, the diaphragm 405 is coupled to a clamping member 411. The diaphragm 405 may include an outer rim 412 adapted to be received by the clamping member 411, for example. The clamping member 411 shown in FIG. 4 comprises a first clamping section 411a and a second clamping section 411b. According to an embodiment of the invention, the diaphragm 405 can be held in place by the first and second clamping sections 411a, 411b. The diaphragm 405 may be placed between the clamping sections 411a, 411b with the clamping sections 411a, 411b compressing the diaphragm 405, thereby holding the outer rim 412 of diaphragm 405 in place. Therefore, while a portion of the diaphragm 405 moves with the control piston 402, the outer rim 412 remains substantially stationary. According to an embodiment of the invention, the clamping member 411 creates a substantially fluid tight seal with the diaphragm 405.

According to an embodiment of the invention, the auxiliary piston 404 is movable within a piston bore 413. As shown, the piston bore 413 is in fluid communication with the process gas chamber 450. According to an embodiment of the invention, a portion of the clamping member 411 forms the piston bore 413 for the auxiliary piston 404. However, it should be appreciated that in other embodiments, the piston bore 413 is formed in the valve block 401, for example. According to an embodiment of the invention, the auxiliary piston 404 comprises a plurality of spaced apart tabs 461, which slide within the piston bore 413. The auxiliary piston 404 may also include a ramp section 460 that transitions between the plurality of tabs 461 and the main body of the auxiliary piston 404, for example. The tabs 461 are described in more detail in the discussion of FIG. 6.

According to an embodiment of the invention, the auxiliary piston 404 may contact the second side 405b of the diaphragm 405. According to some embodiment of the invention, the auxiliary piston 404 can be coupled to the second side 405b of the diaphragm 405; however, in other embodiments, the auxiliary piston 404 may be free to move independent of the diaphragm 405. With the control piston 402 positioned on the first side 405a of the diaphragm 405 and the auxiliary piston 404 positioned on the second side 405b of the diaphragm 405, the auxiliary piston 404 and the control piston 402 are sealed off from one another. Furthermore, the diaphragm 405 can separate the piston bore 413 into two or more portions. A first portion 413a of the piston bore 413 is in fluid communication with the control chamber 408 while the second portion 413b of the piston bore 413 is in fluid communication with the process gas chamber 450. The diaphragm 405 can provide a fluid tight barrier between the first and second portions 413a, 413b of the piston bore 413. Furthermore, the diaphragm 405 isolates the control piston 402 from the second portion 413b of the piston bore 413 in fluid communication with the process gas chamber 450. As a result, process gas, which the auxiliary piston 404 is exposed to, is isolated from the first portion 413a of the piston bore 413, the control pressure chamber 408 and the control piston 402. Furthermore, while the auxiliary piston 404 may move within the piston bore 413 in response to movement of the control piston 402, the diaphragm 405 also isolates the second portion 413b of the piston bore 413 from the control pressure chamber 408 and the control piston 402 to ensure that any impurities that may be in contact with the auxiliary piston 404 and the first portion 413a of the piston bore 413 exposed to the process gas chamber 450 do not communicate with the control piston 402 even when a portion of the control piston 402 enters the piston bore 413.

The auxiliary piston 404 can be adapted to seal against a piston seat 420. The piston seat 420 can be formed proximate a first fluid port 421. As shown, the piston seat 420 can comprise a seal that substantially surrounds the first fluid port 421, for example. According to an embodiment of the invention, the first fluid port 421 is in fluid communication with a pressurized gas supply. The first fluid port 421 can provide pressurized air to the process gas chamber 450. According to an embodiment of the invention, the second fluid port 422 is in fluid communication with the preform and the mold cavity. The second fluid port 422 can therefore communicate the pressurized process gas with the preform and the mold cavity. While the first fluid port 421 is described as comprising the process gas supply and the second fluid port 422 is described as communicating with the mold cavity, it should be appreciated that in some embodiments, the blow molding valve 400 may comprise an exhaust valve. Therefore, the first flow port 421 may communicate with an exhaust rather than a high pressure process gas supply.

According to an embodiment of the invention, the process gas is at a pressure greater than the control pressure. For example, in one embodiment, the process gas may be at a pressure of approximately 40 bar (580 psi), while the control pressure is at approximately 7 bar (102 psi). However, because of the difference in the cross-sectional area of the first side 402a of the control piston 402 compared to the auxiliary piston 404, the control pressure does not need to be as great as the process gas pressure in order to control the position of the pistons 402, 404.

With the auxiliary piston 404 seated against the piston seat 420, process gas is sealed off from the process gas chamber 450. Furthermore, in embodiments where the valve 400 is used to supply process gas to the preform rather than exhaust gas away from the preform, the auxiliary piston can function as a check valve. In other words, the auxiliary piston 404 can substantially prevent pressurized gas that is being exhausted from the preform from entering the process gas chamber 450 or entering the first fluid port 421. Conversely, with the auxiliary piston 404 unseated from the piston seat 420 as shown in FIG. 4, pressurized air is free to enter the process gas chamber 450 and travel to a second fluid port 422.

In use, the pilot valve 406 or some other pressure supply can provide a control pressure to the control pressure chamber 408. With the control pressure chamber 408 pressurized and therefore, acting on the first side 402a of the control piston 402, the control piston 402 is biased to a first position, which is to the left as shown in the figure. With the control piston 402 in the first position, the control piston 402 biases the auxiliary piston 404 to seal against the valve piston seat 420 thereby closing the first fluid port 421 off from the second fluid port 422. Therefore, the preform is not pressurized via the second fluid port 422. Further, pressure in the second fluid port 422 can be sealed off from the process gas chamber 450. It should appreciated that when the control piston 402 is in the first position, a portion of the control piston 402 may be positioned within the piston bore 413. Therefore, the control piston 402 is movable within the control pressure chamber 408 as well as the piston bore 413. However, with the control piston 402 coupled to the diaphragm 405, the diaphragm 405 acts as a liner to substantially isolate the control piston 402 from the second portion 413b of the piston bore 413 in fluid communication with the process gas chamber 450. The diaphragm 405 therefore provides a substantially fluid tight barrier between the second portion 413b of the piston bore 413 and the control piston 402. As a result, the control piston 402 can move within the piston bore 413 without being exposed to contaminates in the process gas.

In order to unseat the auxiliary piston 404 from the piston seat 420, the control pressure chamber 408 is exhausted, thereby relieving the pressure acting on the first side 402a of the control piston 402. Therefore, the pressurized fluid in the first fluid port 421 can bias the auxiliary piston 404 in a second direction, which is to the right as shown in the figure. As the auxiliary piston 404 moves in the second direction, the auxiliary piston 404 biases the control piston 402 and the diaphragm 405 to move in the second direction as well. The pressurized gas is then free to travel through the air chamber 450 and out the second fluid port 422 to the preform, for example. According to an embodiment of the invention, as the auxiliary piston 404 contacts the diaphragm 405 when the auxiliary piston 404 is biased in the second direction, the auxiliary piston 404 can substantially reduce the surface pressure acting on the diaphragm 405. According to an embodiment of the invention, this is because a portion of the second side 405b of the diaphragm 405 will be contacting the auxiliary piston 404 rather than being exposed to the pressurized gas entering the process gas chamber 450. This reduction in the surface pressure of the diaphragm 405 can permit the diaphragm 405 to be used in applications, such as blow molding systems where the process gas pressure can reach, and in some cases exceed, 40 bar (580 psi).

However, while the pressurized gas can communicate with the second side 405b of the diaphragm 405, the supply pressure cannot communicate with the first side 405a of the diaphragm 405 or the control piston 402. Therefore, any contaminates carried in the process gas will not contaminate the control side of the valve, i.e., the portion of the blow molding valve 400 exposed to the first side 405a of the diaphragm 405. As a result, the diaphragm 405 not only functions to isolate the control fluid from the process fluid, but also creates a hygienic barrier.

The hygienic barrier created by the diaphragm 405 advantageously allows the blow molding valve 400 to be cleaned while inline. While many methods of cleaning are possible and within the scope of the present invention, one particular example comprises opening the auxiliary piston 404, thereby unsealing the auxiliary piston 404 from the piston seat 420. With the process air chamber 450 opened, a cleaning solution can be introduced into the system either through the first fluid port 421 or the second fluid port 422. In one particular application, the cleaning solution comprises air heated to approximately 90° C. with 1% $H_2O_2$. This heated solution can be supplied to the process air chamber 450 for approximately 10 minutes. As can be appreciated, the cleaning solution not only cleans the auxiliary piston 404, but also cleans the auxiliary piston bore 413, and the second side 405b of the diaphragm 405. Advantageously, substantially all of the fluid communicating portions of the blow port valve 400 exposed to the second side 405b of the diaphragm 405 can be cleaned while the components of the blow port valve 400 exposed to the first side 405a of the diaphragm 405 remain isolated. This isolation is what allows the on-line cleaning of the auxiliary piston 404.

Figure 5:
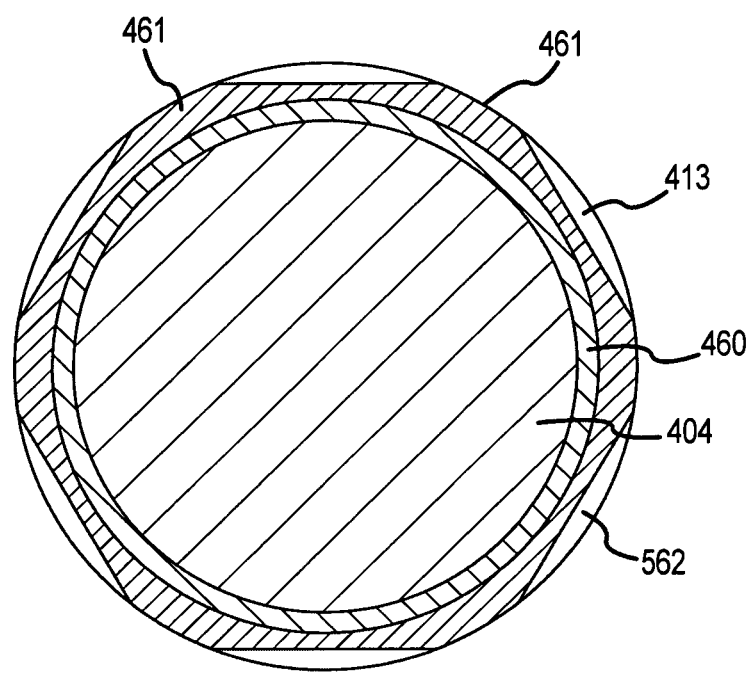
FIG. 5 shows a cross sectional view of an auxiliary piston and a piston bore according to an embodiment of the invention.

FIG. 5 shows a cross-sectional view of the interior of the piston bore 413 along with the auxiliary piston 404 taken along line 5-5 of FIG. 4 according to an embodiment of the invention. As can be seen, the tabs 461 engage the piston bore 413. Therefore, the tabs 461 provide alignment of the auxiliary piston 404 within the piston bore 413. However, because the tabs 461 are spaced apart, between the tabs 461 are gaps 562. According to an embodiment of the invention, the process supply pressure can flow through the gaps 562 to communicate with the diaphragm 405. As a result, the pressure on either side of the auxiliary piston 404 is approximately the same. However, due to the size of the gaps 562, the surface pressure realized by the diaphragm 405 is substantially lower than the surface pressure realized by the auxiliary piston 404. The tabs 461 along with the spaced apart gaps 562 prevent a vacuum from being formed between the diaphragm 405 and the auxiliary piston 404. The spaced apart gaps 562 also allow the cleaning solution to easily flow to the auxiliary piston bore 413 during the cleaning routine. Therefore, according to an embodiment of the invention, the diaphragm 405 replaces the function of the high pressure annular seals of prior art blow molding valves.

Figure 6:
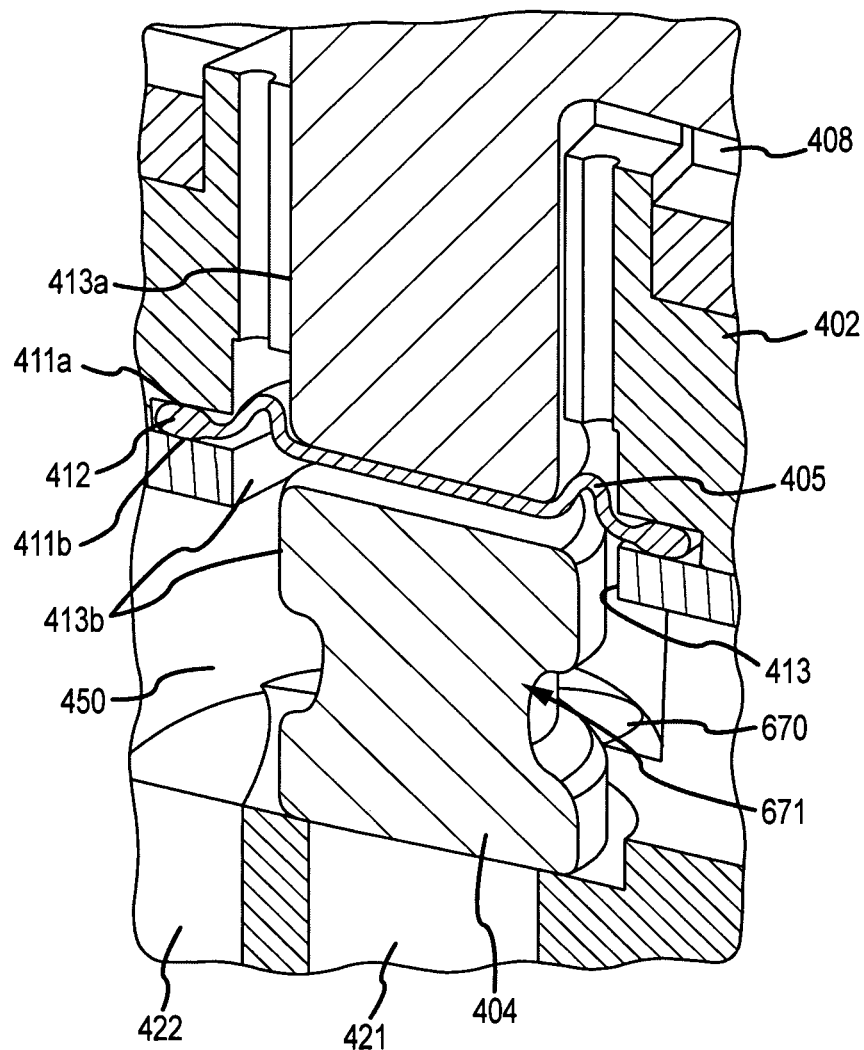
FIG. 6 shows a cross sectional view of the blow molding valve 400 according to another embodiment of the invention.

FIG. 6 shows a cross sectional view of the blow molding valve 400 according to another embodiment of the invention. While the embodiment shown in FIGS. 4 & 5 show the auxiliary piston 404 comprising tabs 461 with associated gaps 562, the embodiment shown in FIG. 6 comprises a substantially round auxiliary piston 404 with one or more breathe ports 670 formed in the piston bore 413. The breathe ports 670 can provide a similar function as the tabs 461 and gaps 562 described above. However, the auxiliary piston 404 can be formed much simpler. Furthermore, according to an embodiment of the invention, the auxiliary piston 404 can include a reduced diameter portion 671. The reduced diameter portion 671 can facilitate faster flow through the breathe ports 670 resulting in a faster response time. In addition, the combination of the breathe ports 670 and the reduced diameter portion 671 can allow the auxiliary piston 404 and the second side 405b of the diaphragm 405 to be cleaned as discussed above.

Figure 7:
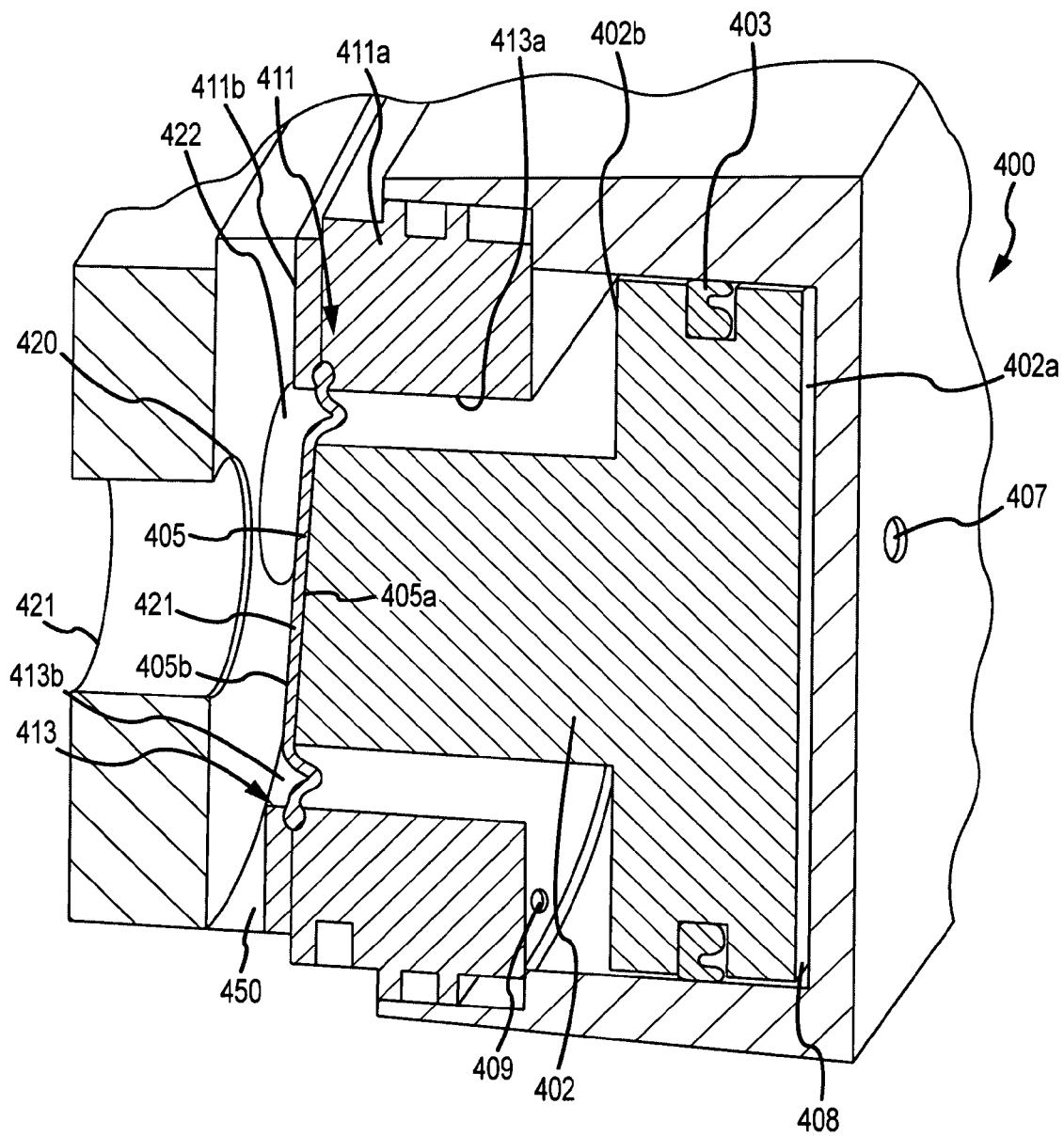
FIG. 7 shows a cross sectional view of the blow molding valve 400 according to another embodiment of the invention.

FIG. 7 shows a cross sectional view of the blow molding valve 400 according to another embodiment of the invention. The embodiment shown in FIG. 4 included an auxiliary piston 404 with the diaphragm 405 being positioned between the control piston 402 and the auxiliary piston 404. As described above, the auxiliary piston 404 provides numerous advantages. For example, in embodiments where the blow molding valve 400 is utilized to supply pressurized gas to the preform and the mold cavity, the auxiliary piston 404 can provide a check valve function. As described above, with the auxiliary piston 404 sealed against the valve seat 420, fluid is substantially prevented from entering the process gas chamber 450 from the first fluid port 421. In some embodiments, the auxiliary piston 404 can also prevent fluid from entering the process gas chamber 450 through the second fluid port 422. According to another embodiment of the invention, the auxiliary piston 404 can reduce the surface pressure of the diaphragm 405. This may be true regardless of whether the blow molding valve 400 is used to supply pressurized gas to the preform or exhaust pressurized gas away from the preform.

FIG. 7 shows the blow molding valve 400 without the auxiliary piston 404. According to an embodiment of the invention, the diaphragm 405 can be positioned between the control piston 402 and the process gas chamber 450. According to the embodiment shown in FIG. 7, the diaphragm 405 can be positioned such that the diaphragm 405 provides a substantially fluid tight barrier between the first portion 413a of the piston bore 413 and the second portion 413b of the piston bore 413. In other embodiments, the diaphragm 405 may be positioned in the process gas chamber 450 rather than in the piston bore 413. According to the embodiment shown, the clamping member 412 forms a portion of the piston bore 413. As shown, the control piston 402 is movable within the control chamber 408 and the piston bore 413 in a similar configuration as shown above in FIG. 4. However, in the embodiment shown in FIG. 7, when the control chamber 408 is pressurized and the control piston 402 is biased in the first direction, the diaphragm 405 forms a substantially fluid tight seal with the valve seat 420 rather than the auxiliary piston 404 as described above. Because the diaphragm 405 is exposed to the fully pressure in the process gas chamber 450 in FIG. 7, a suitable material should be used for the diaphragm 405 that can withstand the normal operating pressures within the process gas chamber 450. It should be appreciated that operation of the blow molding valve 400 shown in FIG. 7 is similar to the operation described above in relation to FIG. 4.

According to the embodiment shown in FIGS. 4-7, the control piston 402 does not require annular seals to separate the process gas chamber 450 from the control chamber 408 as in the prior art designs. Rather, the diaphragm 405 provides the sealing function performed by the annular seals of the prior art. It should be appreciated that without the annular seals, the control piston 402, the auxiliary piston 404, or both can move more easily within the piston bore 413. As a result, the response time of the blow molding valve 400 is faster than the response time of similar blow molding valves that utilize annular high pressure seals. Furthermore, as discussed above, the annular high pressure seals do not seal the control chamber off from the piston bore. In contrast, the diaphragm 405 can effectively seal the control piston 402 and the control pressure chamber 408 off from the portion of the piston bore 413 in fluid communication with the process gas chamber 450, thereby allowing the blow molding valve 400 to be properly cleaned while on-line. The blow molding valve 400 can therefore be cleaned without being disassembled.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other blow-molding valves, and not just to the embodiments described above and shown in the accompanying figures. Accordingly, the scope of the invention should be determined from the following claims.

We claim:

1. A blow molding valve block (401) including a blow molding valve (400) positioned within the blow molding valve block (401), with the blow molding valve (400) comprising:
    a control pressure chamber (408);
    a process gas chamber (450);
    a piston bore (413);
    a control piston (402) movable within the control pressure chamber (408) and a portion of the piston bore (413), the control piston (402) being in fluid communication with a control pressure supply; and
    a diaphragm (405) positioned between the process gas chamber (450) and the control piston (402) such that the diaphragm provides a fluid tight barrier between the process gas chamber (450) and the control piston (402);
    an auxiliary piston (404) movable within the piston bore (413) and the process gas chamber (450), wherein the diaphragm (405) is positioned between the auxiliary piston (404) and the control piston (402), wherein the diaphragm completely separates the auxiliary piston and the control piston, and wherein the auxiliary piston is not rigidly attached to the control piston; and
    a plurality of spaced part tabs (405) extending radially out from the auxiliary piston (404), engaging the piston bore (413), and aligning the auxiliary piston (404) within the piston bore (413).

2. The blow molding valve block (401) of claim 1, wherein the plurality of spaced apart tabs (461) form a plurality of gaps (562) that provide fluid communication between the process gas chamber (450) and a second side (405b) of the diaphragm (405).

3. The blow molding valve block (401) of claim 1, further comprising:
    a first fluid port (421) formed in the process gas chamber (450); and
    a second fluid port (422) formed in the process gas chamber (450);
    wherein the auxiliary piston (404) is adapted to form a substantially fluid tight seal with a piston seat (420) proximate the first fluid port (421).

4. The blow molding valve block (401) of claim 1, further comprising a clamping member (411) adapted to receive a portion of the diaphragm (405) and provide a substantially fluid tight seal with the diaphragm (405).

5. The blow molding valve block (401) of claim 4, wherein the clamping member (411) forms at least a portion of the piston bore (413).

6. The blow molding valve block (401) of claim 1, wherein the diaphragm (405) is positioned within the piston bore (413) such that a portion (413b) of the piston bore (413) is in fluid communication with the process gas chamber (450) and wherein the diaphragm (405) forms a substantially fluid tight barrier between the portion (413b) of the piston bore (413) in fluid communication with the process gas chamber (450) and the control piston (402).

7. The blow molding valve block (401) of claim 1, further comprising a control port (407) formed in the control pressure chamber (408) and adapted to communicate a control pressure supply with a first side (402a) of the control piston (402).

8. The blow molding valve block (401) of claim 1, further comprising a vent port (409) formed in the control pressure chamber (408) and in fluid communication with a second side (402b) of the control piston (402).

9. A method for forming a blow molding valve block with a blow molding valve positioned within the blow molding valve block comprising the steps of:
    positioning a control piston within a control pressure chamber such that the control piston is movable within the control pressure chamber and movable within a portion of a piston bore; and
    positioning a diaphragm between a process gas chamber and the control piston such that the diaphragm provides a fluid tight barrier between the process gas chamber and the control piston;
    positioning an auxiliary piston movably within the piston bore, wherein the diaphragm is positioned between the auxiliary piston and the control piston, wherein the diaphragm completely separates the auxiliary piston and the control piston, and wherein the auxiliary piston is not rigidly attached to the control piston; and
    wherein a plurality of spaced apart tabs extend radially from the auxiliary piston, engage the piston bore, and align the auxiliary piston in the piston bore.

10. The method of claim 9, wherein a plurality of spaced apart tabs form a plurality of gaps that provide fluid communication between the process gas chamber and a second side of the diaphragm.

11. The method of claim 9, further comprising steps of:
forming a first fluid port in the process gas chamber;
forming a second fluid port in the process gas chamber; and
positioning a piston seat proximate the first fluid port adapted to form a fluid tight seal with the auxiliary piston.

12. The method of claim 9, further comprising the step of positioning a portion of the diaphragm in a clamping member to form a fluid tight seal.

13. The method of claim 12, further comprising the step of forming an auxiliary piston bore of the clamping member.

14. The method of claim 9, wherein the diaphragm is positioned within the piston bore such that a portion of the piston bore is in fluid communication with the process gas chamber and wherein the diaphragm forms a substantially fluid tight barrier between the portion of the piston bore in fluid communication with the process gas chamber and the control piston.

15. The method of claim 9, further comprising the step of forming a control port in the control pressure chamber that is adapted to communicate a control pressure supply with a first side of the control piston.

16. The method of claim 9, further comprising the step of forming a vent port in the control pressure chamber that is adapted to communicate with a second side of the control piston.

* * * * *